US006563471B2

(12) United States Patent
Spirtus

(10) Patent No.: US 6,563,471 B2
(45) Date of Patent: May 13, 2003

(54) AUTOMATIC POINTING ANTENNAE SYSTEM

(75) Inventor: Danny Spirtus, Holon (IL)

(73) Assignee: Gilat Satellite Networks, Ltd., Petak Tikya (IL)

(*) Notice: Subject to any disclaimer, the term of this patent is extended or adjusted under 35 U.S.C. 154(b) by 0 days.

(21) Appl. No.: 09/986,462

(22) Filed: Nov. 8, 2001

(65) Prior Publication Data

US 2002/0057225 A1 May 16, 2002

Related U.S. Application Data

(60) Provisional application No. 60/246,572, filed on Nov. 8, 2000.

(51) Int. Cl.[7] ............................ H01Q 3/00; H04H 1/00; H04N 7/10

(52) U.S. Cl. ....................... 343/757; 343/713; 343/763; 455/3.2; 342/359

(58) Field of Search ................................ 343/757, 713, 343/758, 763, 766; 342/359, 73, 76, 350; 455/3.2, 3.1, 4.1, 4.2, 6.2

(56) References Cited

U.S. PATENT DOCUMENTS

| | | | |
|---|---|---|---|
| 4,743,909 A | 5/1988 | Nakamura et al. | |
| 4,873,526 A | * 10/1989 | Katsuo | 318/649 |
| 5,077,560 A | 12/1991 | Horton et al. | |
| 5,089,825 A | 2/1992 | Suzuki | |
| 5,983,071 A | * 11/1999 | Gagnon et al. | 342/359 |
| 6,334,218 B1 | 12/2001 | Jeong et al. | |

FOREIGN PATENT DOCUMENTS

| | | |
|---|---|---|
| EP | 0 579 407 A1 | 1/1994 |
| GB | 2 196 183 A | 4/1988 |
| WO | WO 90/03667 | 4/1990 |

OTHER PUBLICATIONS

F. Rahman, Boresight Pointing Calibration of Communication Satellite Through In–Orbit Antenna Tests, IEEE Transactions on Instrumentation and Measurement, vol. 42, No. 2, Apr. 1993, New York, pp. 553–556.

* cited by examiner

*Primary Examiner*—Don Wong
*Assistant Examiner*—Chuc Tran
(74) *Attorney, Agent, or Firm*—Banner & Witcoff, Ltd.

(57) ABSTRACT

A system and method for automatically positioning/directing satellite antennas towards a satellite with which it is to communicate. The system and method may use characteristics of symmetry of mutually exclusive orthogonal axes. By using the symmetry of the antenna main beams, the ideal direction of the antenna can be attained and, at the same time, maximum cross-polarization may be achieved. The cross polarization may be required in order not to interfere with the orthogonal polarization. The system and method may position the Antenna on three mutually exclusive orthogonal planes, including the azimuth plane, the elevation plane, and the polarization plane. The system and method may include an indoor unit, which may include a satellite receiver, a telemetric transmission, and supply of voltage to a control system and which may control a drive motor and/or an electronic search device; and an outdoor unit, which may include a supervisory unit, a motor, and a control unit. The outdoor unit is preferably configured to conduct a search in the three orthogonal planes which may facilitate positioning the Antenna with a high degree of accuracy.

33 Claims, 20 Drawing Sheets

*Fine Search Flowchart*

*Fine Search Algorithm*

1. Acquire local maximum on azimuth

*Fine Search Algorithm*

1. Acquire local maximum on azimuth
   1.1 Scan azimuth in some direction

*Fine Search Algorithm*

1. Acquire local maximum on azimuth
   1.1 Scan azimuth in some direction
   1.2 If gradient is negative switch direction

*Fine Search Algorithm*

1. Acquire local maximum on azimuth
   - 1.1 Scan azimuth in some direction
   - 1.2 If gradient is negative switch direction
   - 1.3 Continue till gradient is negative again & calculate threshold for symmetrical search The movement is stopped when feedback signal is just above a pre-defined level in order not to lose satellite acquisition

*Fine Search Algorithm*

2. Find center of azimuth reading using symmetrical scan

*Fine Search Algorithm*

2. Find center of azimuth reading using symmetrical scan

Scan AZ axis at the fixed elevation till negative gradient and feedback signal is below a predefined threshold (see 1). While scanning capture points of pre-calculated thresholds (1.3)

The step is repeated in both directions to compensate for delays (to be examined during integration)

*Fine Search Algorithm*

2. Find center of azimuth reading using symmetrical scan

Calculate center using the found thresholds and move there

*Fine Search Algorithm*

3. Repeat Step 1 and 2 for Elevations axis

*Fine Search Algorithm*

4. Iterate the whole process - until convergence criteria fulfilled
END

*Top level System chart*

*Commands*

The following move commands may be available during search. This set is maximal and a reduced set may be sufficient.

- Move <axis #>, <direction>, <Step size>
- Scan <axis #>, <direction>
- Home <axis #>
- Stop It may be desirable to include any combinations of the above commands inside one byte. Thus, only a very simple protocol is required.

*Fig. 16*

*Time Estimation*

Assumptions -
- Search range: 15 deg EL, 30 deg AZ
- Search speed: 1 deg/sec
- Fine search speed: 0.1 deg/sec
- Step size: 1 deg
- Delay between steps: 1 sec Course Search time
- Average time (assuming good initial positioning) - 2 min
- Half area search - 7 min
- Worst case - 14 min (no detection, for one polarization angle)

Fine Search time
- One Axis iteration - 40 sec
- Assuming 4 iterations - 3 min

Total Search (Average)
- 5 min to 10 min

*Fig. 17*

*Ways to Optimize search*

Optimize delay time between steps assuming that during movement the antenna receives a signal that is processed by the VSAT Increase fine search speed by factor of 2 (0.2 deg/sec instead of 0.1 deg/sec)

Assume correct positioning by the customer and make a spiral search

Narrow the search area

*Fig. 18*

Exemplary System Configuration

AUTOMATIC POINTING ANTENNAE SYSTEM

This application claims priority to provisional U.S. Application Ser. No. 60/246,572 filed Nov. 8, 2000, herein incorporated by reference.

BACKGROUND OF THE INVENTION

The present invention relates to the field of satellite communications. More particularly, the present invention relates to systems and methods for automatically setting-up antennas for very small aperture satellite terminals.

Currently in the industry, to position an Antenna, a skilled technician is required to position the Antenna manually by use of certain positioning equipment. This equipment is separate from and external to the Antenna. This currently used manual mechanism requires a professional/skilled person to attend the location where an Antenna is to be installed and position the antenna, representing significant resources and costs. Further, this complex procedure is beyond the capabilities of the average homeowner prohibiting the homeowner from performing a self installation. Hence there is a need for a low cost and simple system and method which enables the average homeowner to install satellite equipment.

SUMMARY OF THE INVENTION

In order to overcome the disadvantages of conventional systems, there are a number of objects and associated aspects of the present invention.

Aspects of the present invention include a mechanism for automatically positioning/directing satellite antennas at an end user location towards a satellite with which it is to communicate. Without limiting the foregoing, this mechanism can be used for antennas which comprise part of a satellite-based VSAT communications system for communication.

Other aspects of the invention include the automatic positioning/directing of an Antenna without the need for a skilled person to attend the Antenna installation site in order to position the Antenna. Further aspects of the invention include allowing a consumer/end-user to direct/position an Antenna without any requirement for input from a skilled technician. This represents significant cost savings and is especially significant for satellite-based VSAT communications networks designed to be installed by a homeowner or in home based applications.

Further aspects of the invention may include systems and methods which enable an Antenna to be automatically positioned/directed to a predetermined position. The systems and methods may include applying the use of characteristics of symmetry of mutually exclusive orthogonal axes. In these embodiments, by using the symmetry of the antenna main beams, the ideal direction of the antenna can be attained (this ideal direction is known as "maximum gain point") and, at the same time, maximum cross-polarization may be achieved. The cross polarization may be required in order not to interfere with the orthogonal polarization.

The positioning of an Antenna towards a satellite typically requires a high degree of accuracy. In order for an unskilled person to attain this high degree of accuracy, the systems and methods contained herein may include:

1. a maximum gain for receiving and transmitting satellite communications;
2. a cross-polarization for the receiving frequencies and particularly for transmitting frequencies. The cross-polarization may be advantageous in that the system will not interfere with orthogonal polarization; and
3. maintaining symmetry of the receiving and the transmission beams, and particularly the main beam, for receiving and transmitting communication, so as not to interfere with satellite communication of other satellites.

The above features may be utilized individually or in combination. Where used in combination, the above features have the advantage of minimizing the positioning/direction error.

In aspects of the invention, the system and method may position the Antenna on three mutually exclusive orthogonal planes. These typically include:

(i) the azimuth plane;

(ii) the elevation plane; and (iii) the polarization plane.

In still further aspects of the invention, the system and method may include three sub-mechanisms each of which may contain instructions for mechanical and electronic positioning of the Antenna towards the satellite. To do this with the degree of accuracy required for enabling satellite communication, an accuracy greater than 1/10th of the beam width of the Antenna may be required.

In other aspects of the invention, the system and method may comprises two principal components:

(a) an indoor unit (IDU), which may include a satellite receiver, a telemetric transmission (feed back on the strength of the signal), and supply of voltage to a control system (which may be contained in the ODU) and which may control a drive motor and/or an electronic search device; and (b) an outdoor unit (ODU), which may include a supervisory unit, a motor, and a control unit (e.g., an electronic control unit). The outdoor unit is preferably configured to conduct a search in the three orthogonal planes which may facilitate positioning the Antenna with a high degree of accuracy. This is according to the messages received from indoor unit telemetry.

By use of the symmetry principle of the receiving beam and the polarization plane, a search may be conducted for the symmetry in each one of the said planes. The symmetry principle may be applied to the search of the three dB points (−3 dB) for each one of the orthogonal planes. By locating a signal from the satellite at a point of symmetry, it may be possible to find the point at which two points of symmetry are of the highest possible values. If we add further points of symmetry, such as the −5 dB point, it is possible to improve the positioning ability of the systems and methods described herein and obtain a more accurate positioning of the main beam. As the number of symmetry points increases, so does the accuracy of the systems and methods described herein.

In still further aspects of the invention, the stages for implementing the systems and methods described herein may include:

1. a manual positioning of the Antenna in the three planes described above according to the satellite's position and the Antenna's geographic location, by using a compass. These measurements can be obtained by using known tables and known parameters.
2. operating the automatic searching components which may be configured to search for the symmetry in the three planes mentioned above. This procedure can be repeated a number of times until attainment of an acceptable value.

3. the system may then be configured to "inform" the user whether or not the search was done successfully.

Typically in satellite-based VSAT communications networks, a central data processing center may communicate with hundreds, thousands, tens of thousand, or even hundreds or thousands of remote sites. At each of these remote sites, an Antenna (among other things) needs to be installed. Under currently available technology skilled technicians are required to attend each remote sites to position an Antenna, representing significant costs. The systems and methods described herein eliminate this requirement.

These and other features of the invention will be apparent upon consideration of the following detailed description of preferred embodiments. Although the invention has been defined using the appended claims, the invention may include one or more aspects of the embodiments described herein including the elements and steps described in any combination or sub combination. For example, it is intended that each of the above aspects of the invention may be used individually and/or in combination with one or more other aspects of the invention defined above, in the drawings, and/or in connection with the detailed description below. Accordingly, there are any number of alternative combinations for defining the invention, which incorporate one or more elements from the specification, including the description, claims, aspects of the invention, and/or drawings, in various combinations or sub combinations. Accordingly, it will be apparent to those skilled in satellite communication art in view of the present specification, that alternate combinations and sub combinations of one or more aspects of the present invention, either alone or in combination with one or more elements and/or steps defined herein, may constitute alternate aspects of the invention. It is intended that the written description of the invention contained herein cover all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by the way of example, and not by way of limitation with regard to the claimed invention in the accompanying figure in which like reference numerals indicate similar elements.

FIG. 16 shows exemplary commands which may be used to operate the systems and methods described herein.

FIG. 17 shows time estimations which may result from the use of systems and methods described herein.

FIG. 18 shows systems and methods for optimizing the systems and methods described herein.

DETAILED DESCRIPTION OF THE INVENTION

Figure 1:
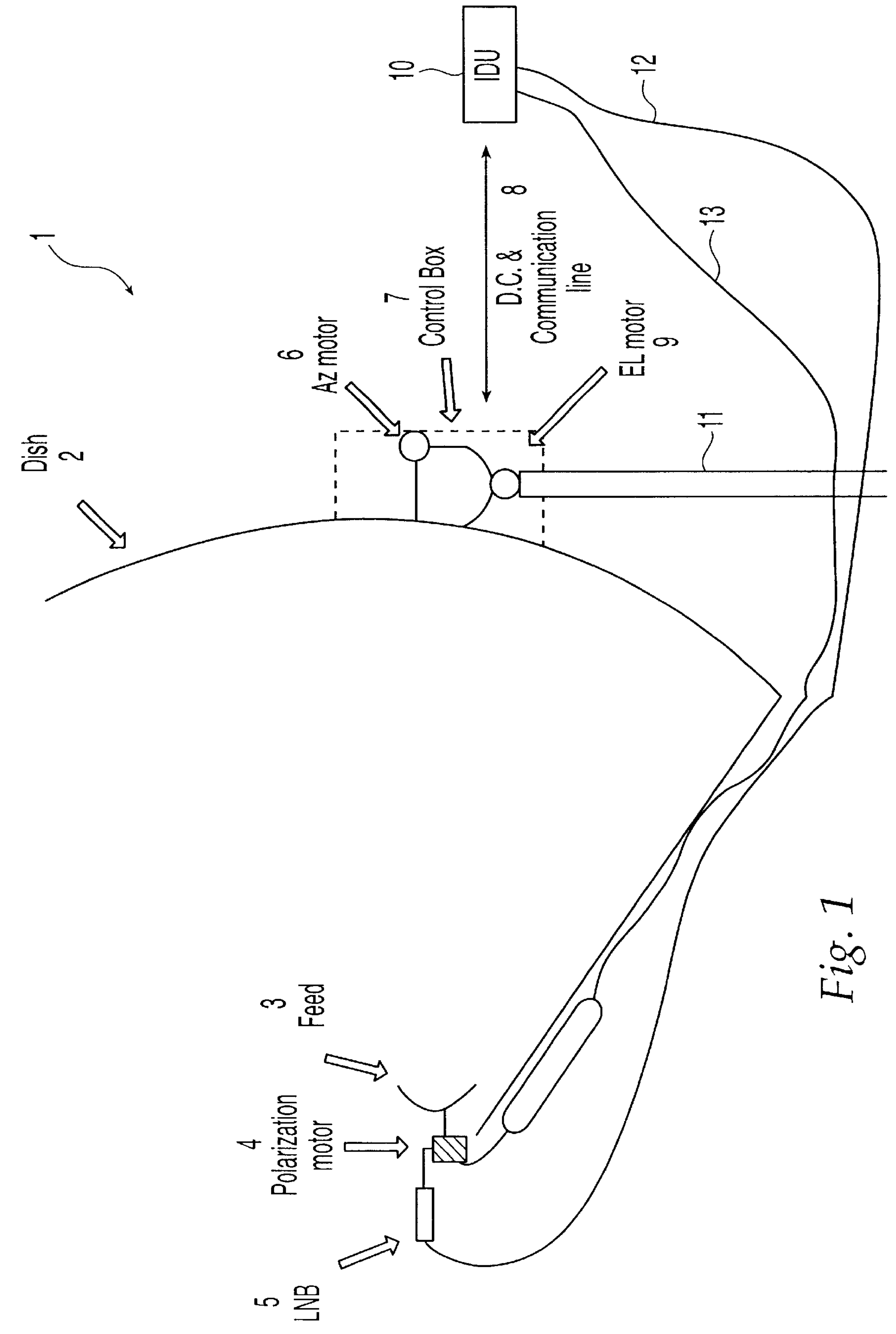
FIG. 1 shows an exemplary block diagram of a system embodying aspects of the present invention.

Referring to FIG. 1, embodiments of one or more aspects of the present invention may include an automatic satellite positioning system 1 having a dish 2, a feed horn 3 receiving signals reflected from the dish 2, a polarization motor 4 for controlling the polarization position of the feed horn 3, a low noise block 5, coupling a signal from the dish 2 and feed horn 3 to and/or from the indoor unit 10 via cable 12. Similarly, the indoor unit 10 may provide a control for communicating via cable 13, which may or may not be different from cable 12.

In still further aspects of the invention, the dish 2 may be supported by a structure which includes, for example, an azimuth (az) motor 6 and/or a elevation (el) motor 9. The control box 7 may be included to interface between the indoor unit and the azimuth motor 6, the elevation motor 9, and polarization motor 4. For example, in FIG. 1, a line 8 represents a power voltage and a communication line connecting the control box to the indoor unit. The D.C. can be separate or can be incorporated within the co-axial cable, i.e. it can be the same wire.

Figure 2:
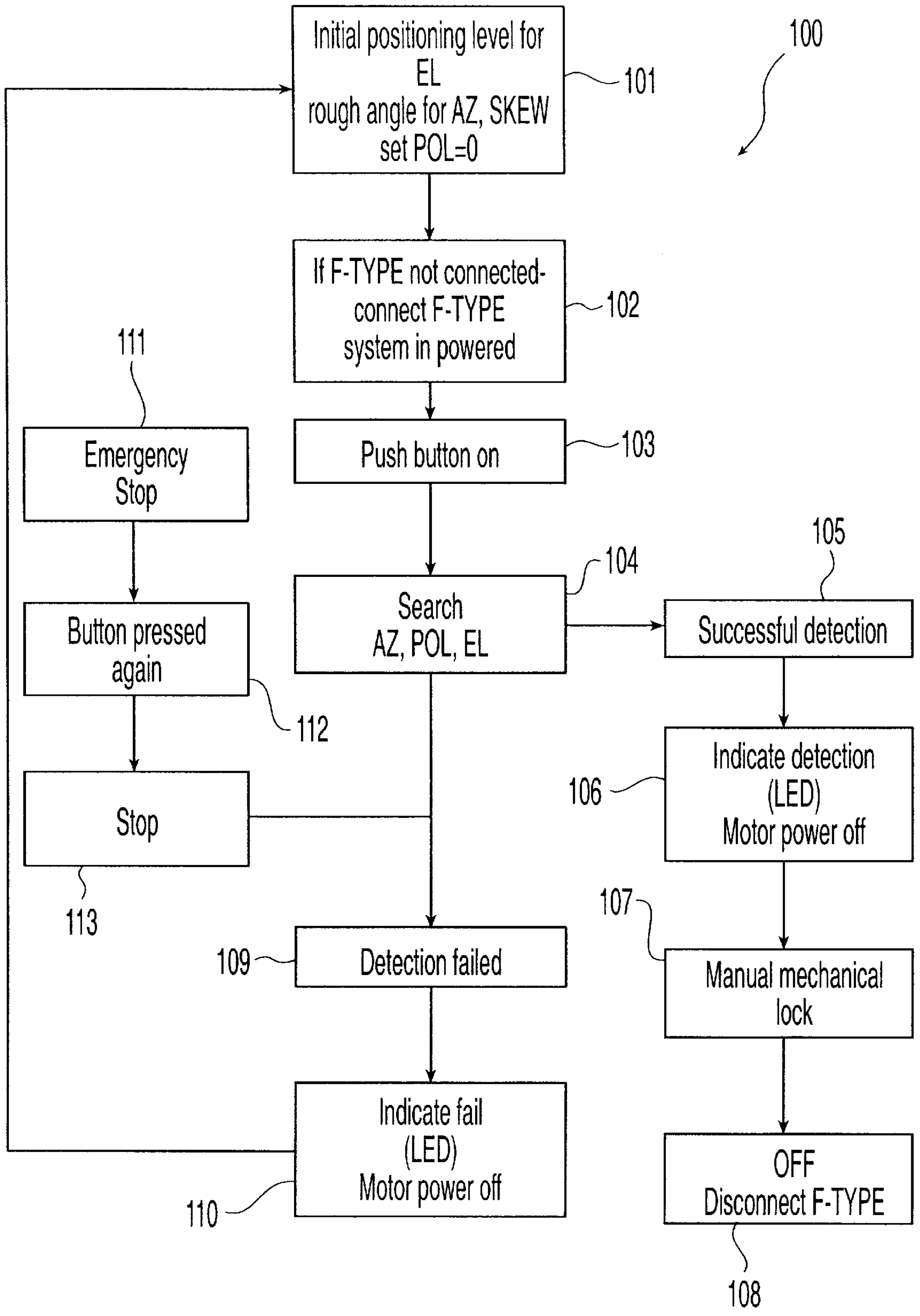
FIG. 2 shows a top level state diagram of a method which may be implemented using the system shown in FIG. 1.

FIG. 2 shows a top level state diagram 100 describing aspects of the system and method for tuning an antenna array. In this embodiment, a search is performed of the azimuth, elevation, and polarization positions. As indicated, the search may be performed in any suitable order and using a suitable search routine. In the illustrated embodiment, in step 101, the initial positioning level is determined for skew and a rough angle for azimuth and elevation. The polarization may be set to 0. In step 102, a check may be made to ensure that the control cable connector is connected to the control box. In step 103, the on button is pushed, and a search begins at step 104. Step 104 performs a search of the azimuth, elevation, and polarization. For each search, the appropriate motor is moved and the search is conducted as described below.

In step 109, if the detection fails, the fail LED is illuminated and an error is returned to the user 110. Additionally, an emergency stop 111, 113 may occur where the start/stop button is pressed again 112.

Upon successful detection step 105, the LED or other display indicating successful detection is illuminated. The motor may be powered off so that a manual locking mechanism on the antenna may be engaged preventing misalignment.

Figure 3:
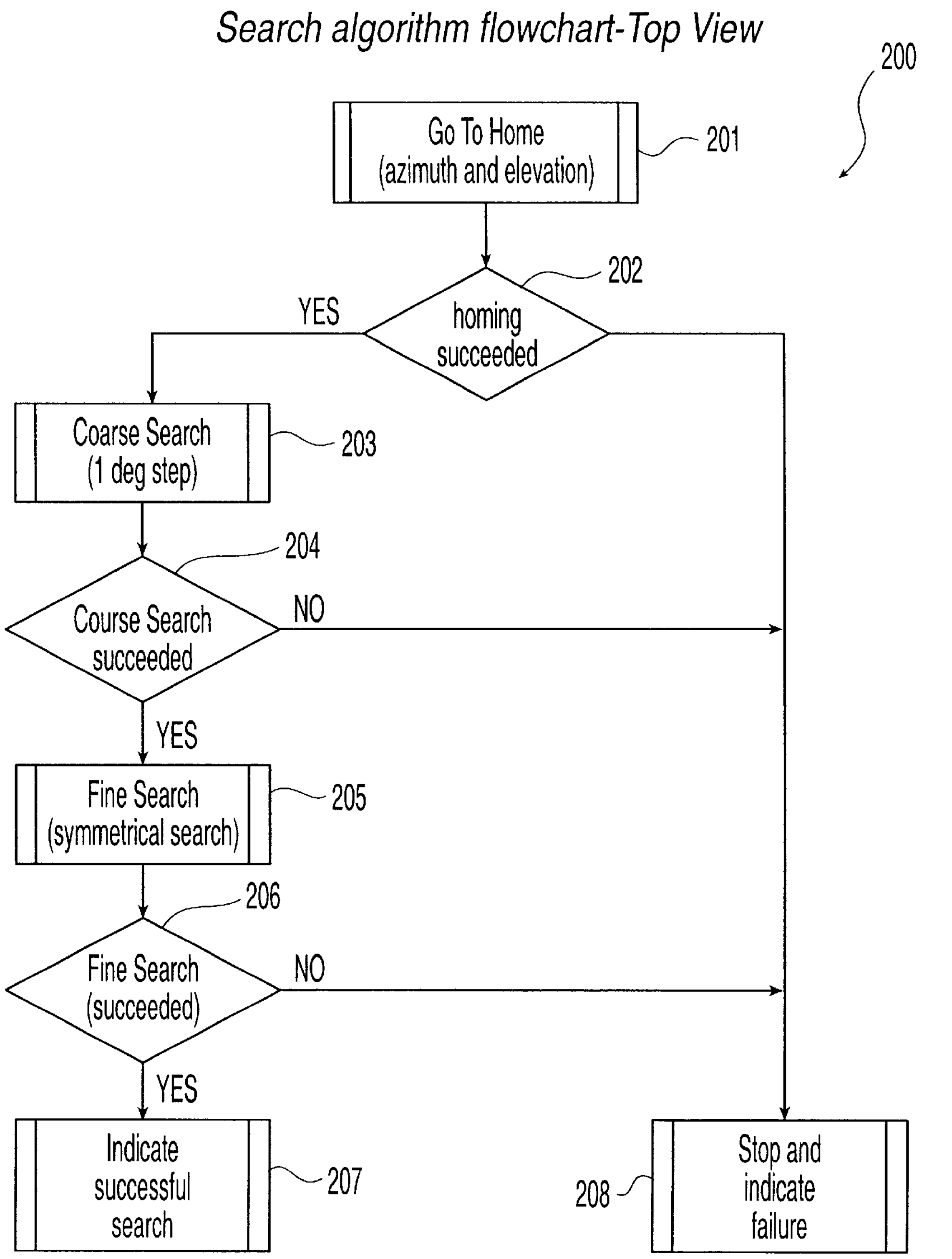
FIG. 3 shows one exemplary search algorithm flowchart.

FIG. 3 shows a first exemplary search algorithm flow chart 200 having a course search step, and a fine search step. For determining azimuth, elevation, and polarization, a first course search may be made 203 scanning across until the course search succeeds 204. Where the course search succeeds, a fine search (typically symmetrical) is executed step 205. The fine search continues until it succeeds 207 or fails 208.

Figure 4:
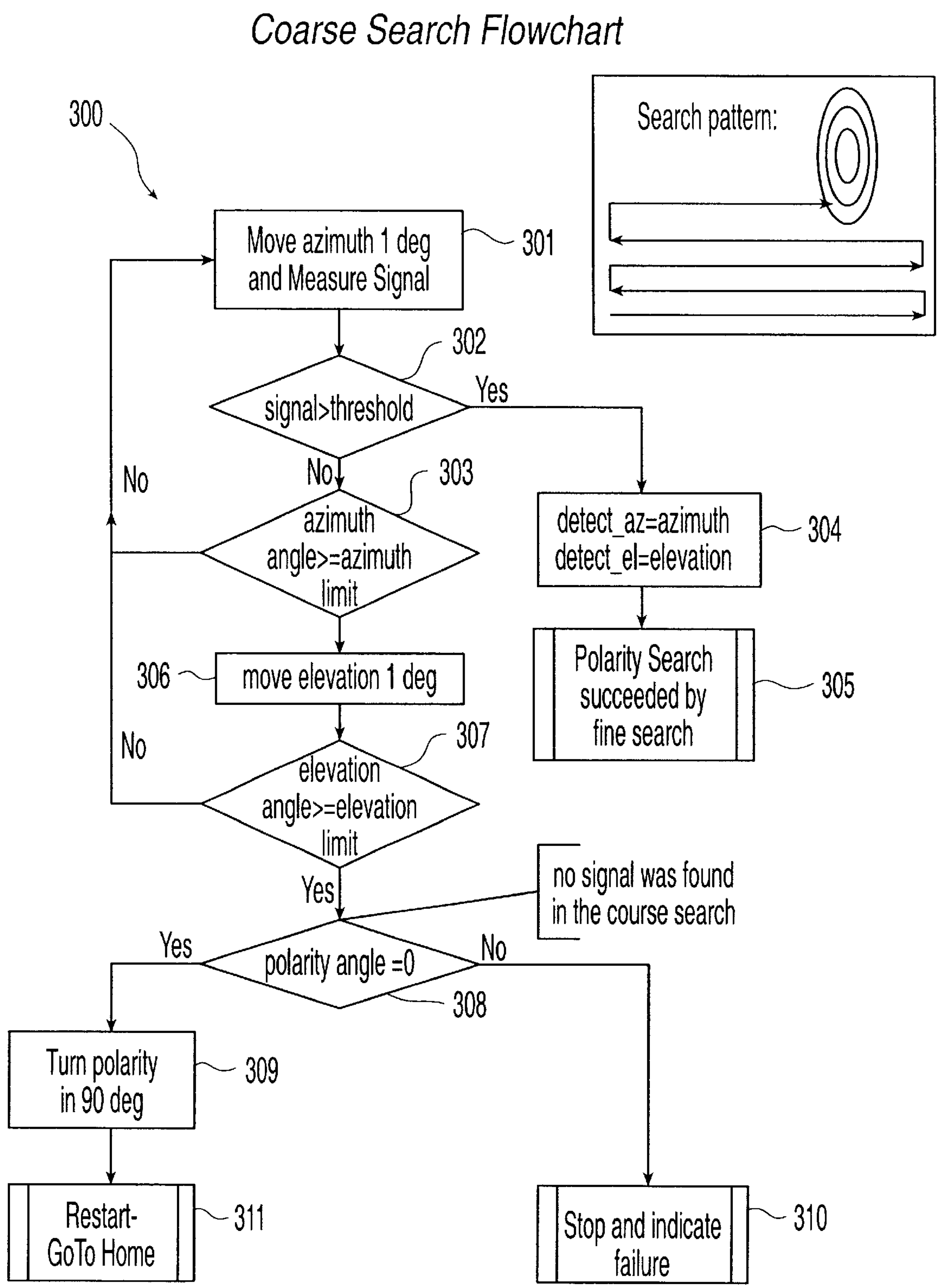
FIG. 4 shows one exemplary coarse search algorithm.

FIG. 4 shows the steps which may be employed in the coarse search 300. The coarse search may move the azimuth or elevation a predetermined number of coarse degrees (e.g., 1 degree) and then measure the signal. For example, in step 302 a signal threshold is detected. Where the signal is greater than a threshold 302, the azimuth, elevation and polarization is set in step 304.

Where the signal is not greater than a threshold, the azimuth, for example, is modified. This may continue until the azimuth is out of range step 303. Where the azimuth becomes out of range, the elevation is moved a predetermined amount such as 1 degree step 306. Where the azimuth is within a predetermined range, it is modified by a predetermined amount such as one degree step 301.

Where the elevation is modified in step 306, a check is performed in step 307 to determine if the elevation is out of range. If the elevation is out of range and no signal was found during the course search, the polarity angle may be turned 90 degrees step 309 and the search repeated step 311 at step 301. Where the polarity has been modified already, a failure may be indicated in step 310.

Figure 5A:
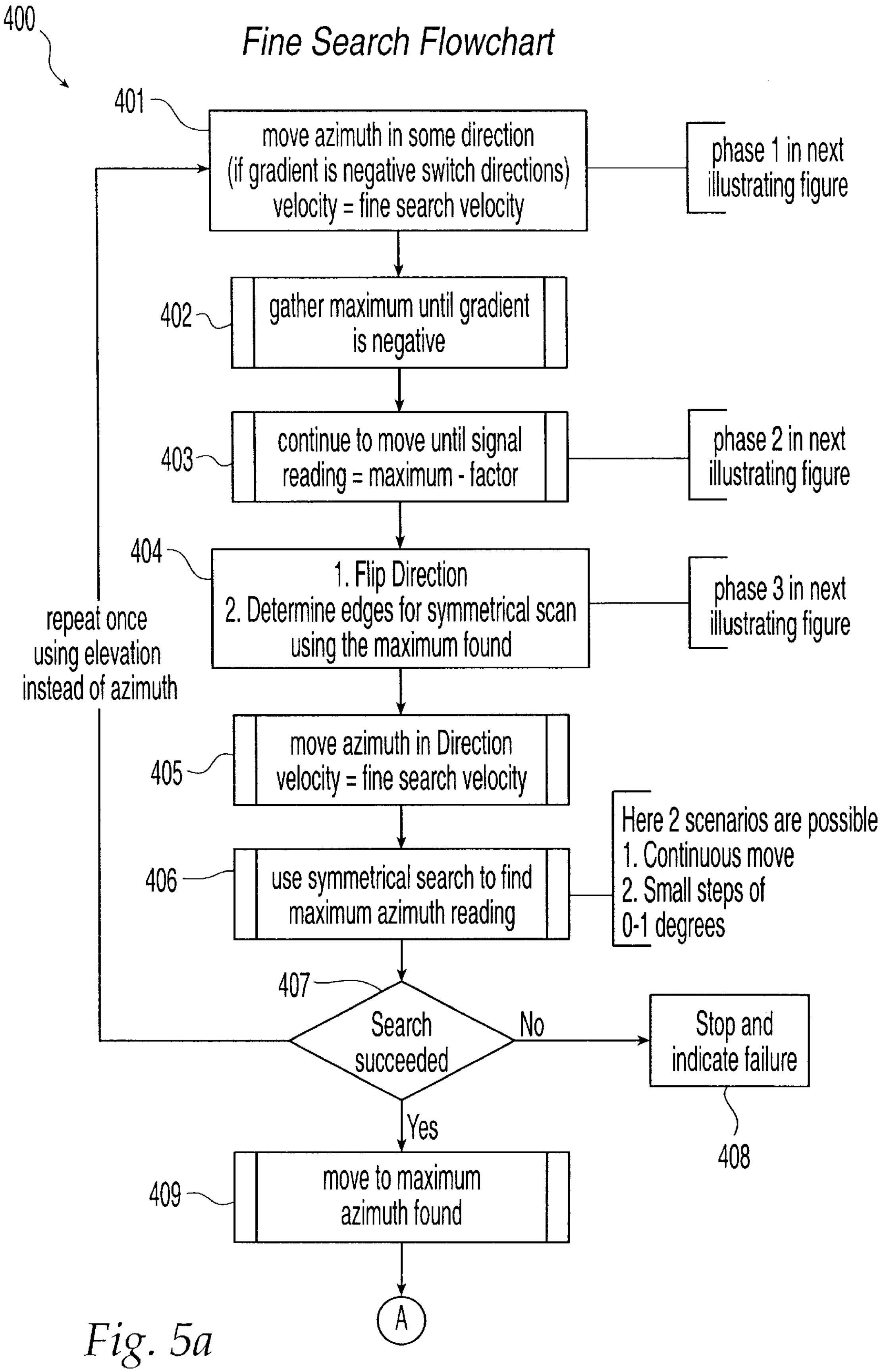
FIGS. 5*a* and 5*b* each show an exemplary fine search algorithm.
Figure 5B:
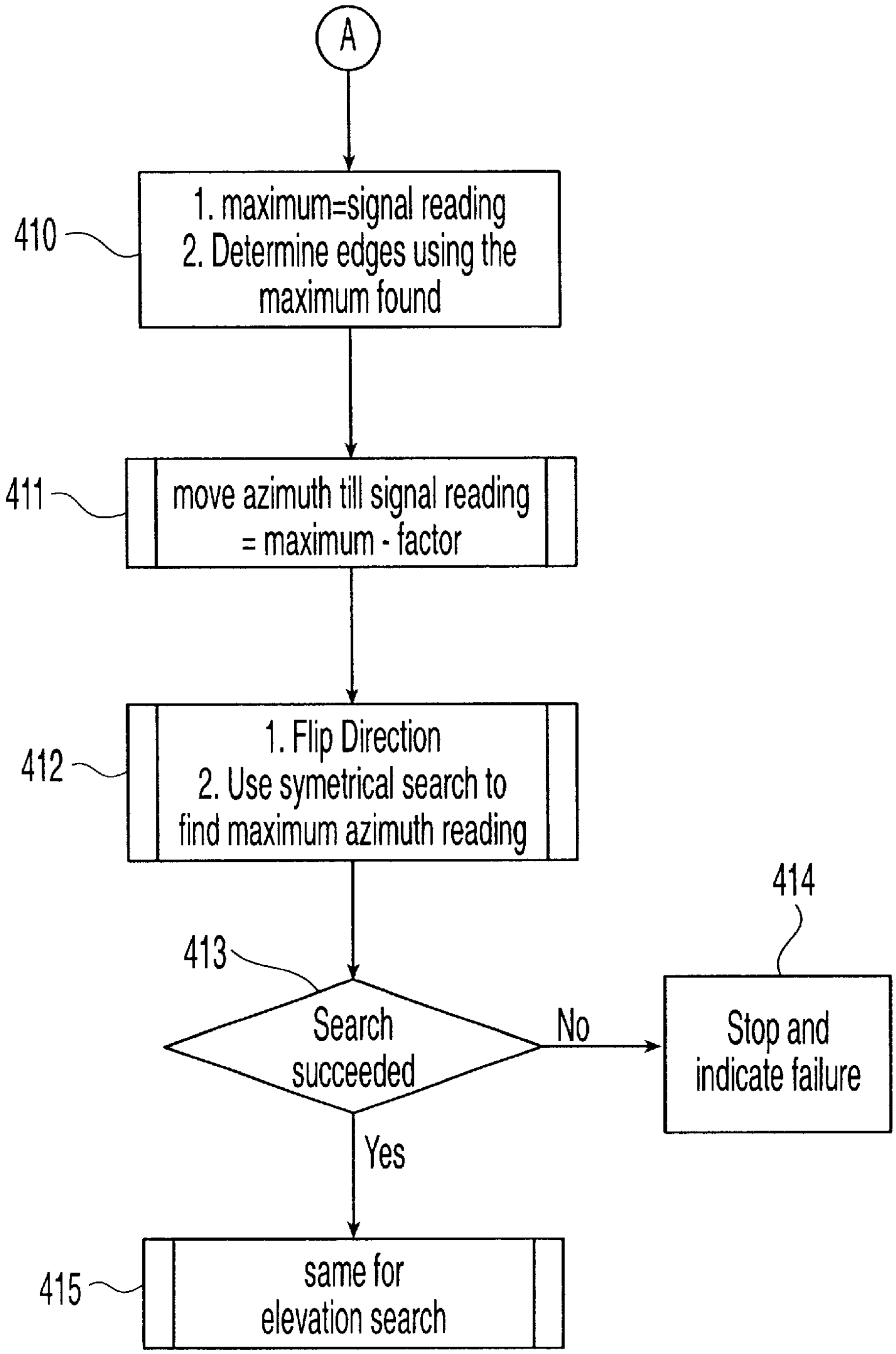
Figure 6:
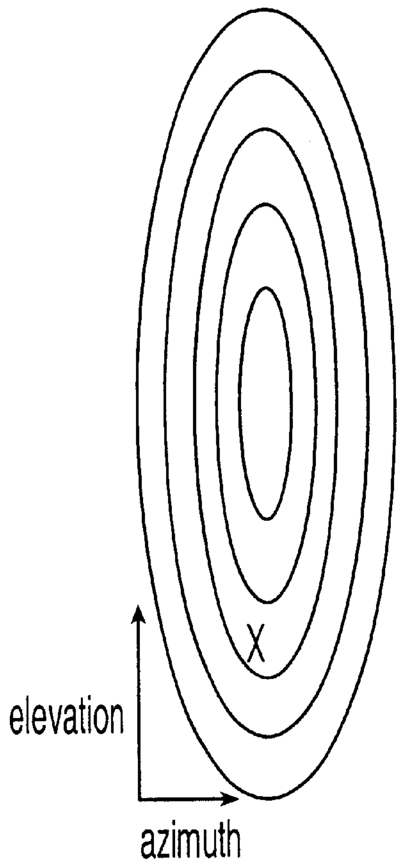
FIGS. 6–9 show one exemplary fine search algorithm.
Figure 7:
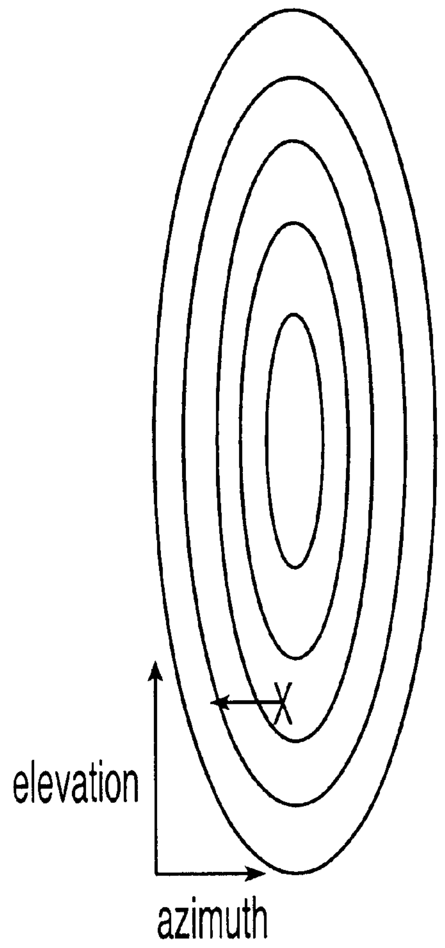
Figure 8:
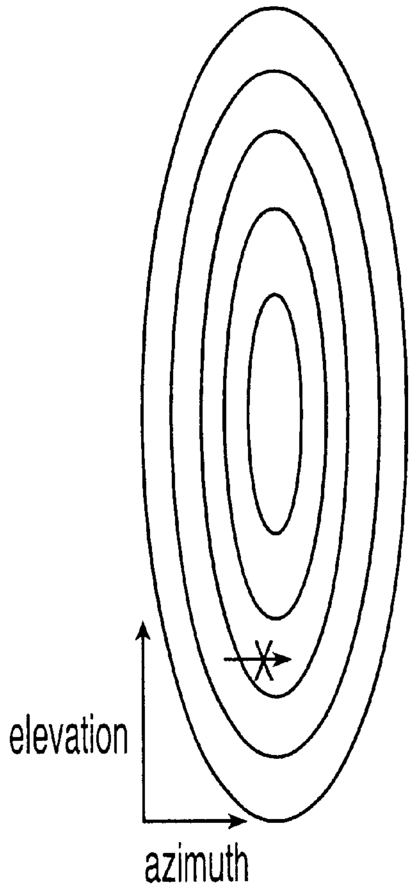
Figure 9:
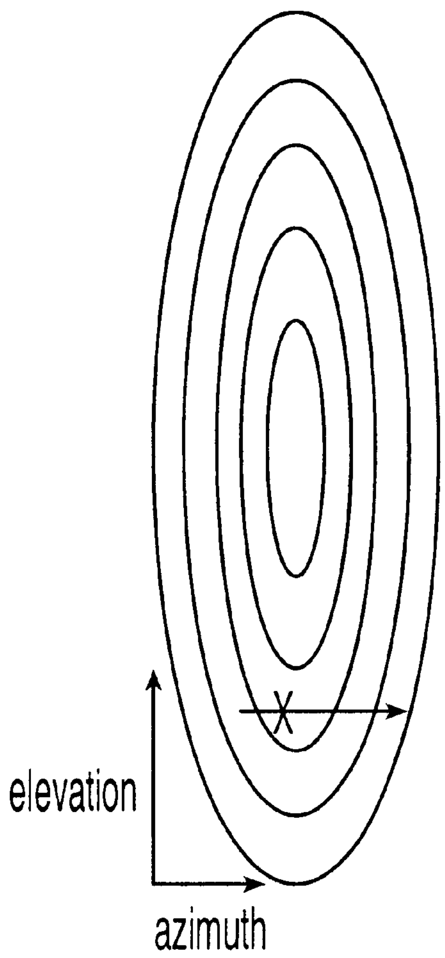

FIGS. 5*a* and 5*b* shows the steps which may be employed in the fine search for the azimuth, elevation, and polarization steps 400. In step 401, the azimuth is moved in some direction. If the gradient is negative, the direction may be switched step 402. The velocity of the motor in moving the dish may have a fine and course adjustment, with the fine adjustment moving the dish more slowly. This process may continue step 403 until the system acquires the local maximum azimuth. These adjustments may be described as the phase I–phase III adjustments and shown in FIGS. 6–9. For example, FIG. 6 shows that the local maximum azimuth may be acquired by starting at a point. The azimuth is scanned in some direction as shown in FIG. 7. Where the gradient is negative, the azimuth is scanned in a different direction, FIG. 8. This process is continued until the gradient is negative again. A threshold may then calculated, FIG. 9, for a symmetrical search. The movement may be stopped when the feedback signal is just above a predefined level in order not to lose satellite acquisition.

Figure 10:
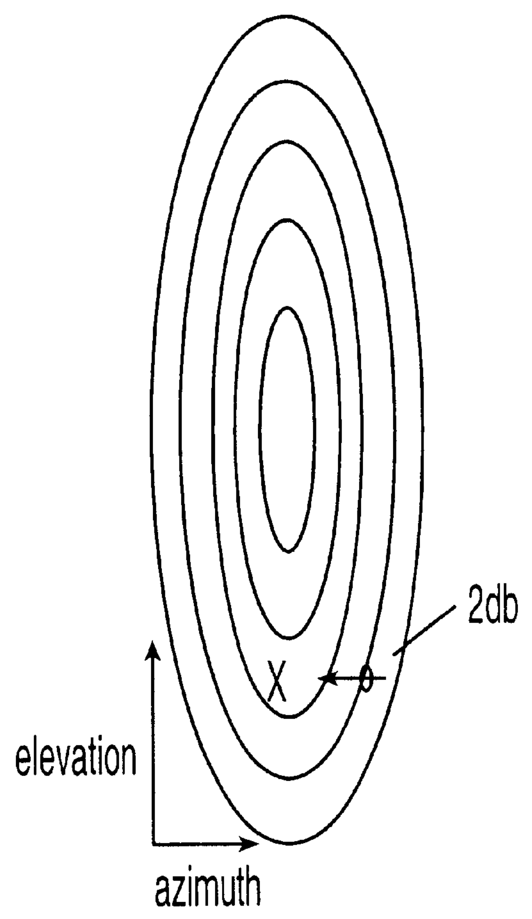
FIGS. 10–12 show a second exemplary fine search algorithm.
Figure 11:
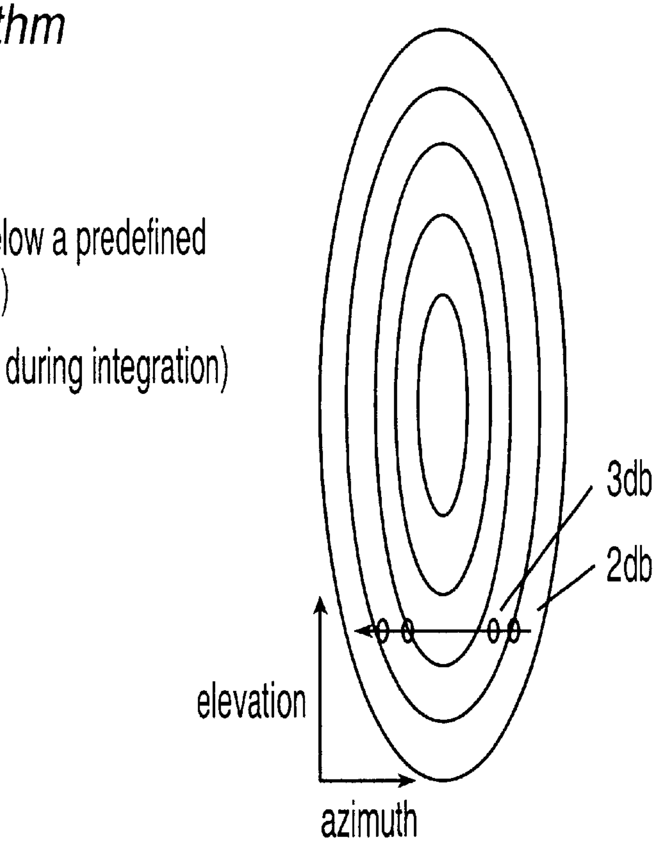
Figure 12:
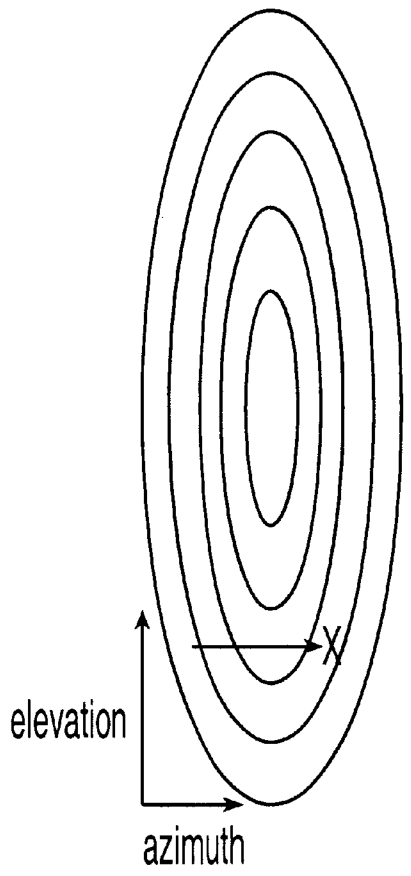

Again referring to FIGS. 5*a* and 5*b*, in steps 406, the steps may be continuous or in small steps of a predetermined amount, e.g., 0.1 degrees. Where the search has succeed, step 407, the system may be moved to the maximum azimuth found step 409. Where the search failed, a failure may be indicated, step 408. In step 410, 411, it may be desirable to continue to move the dish until the signal reading equals a maximum factor. For example, as shown in FIGS. 10–12, the center of the azimuth reading may be located using a symmetrical scan. In one exemplary embodiment, the center of the azimuth is found by scanning the azimuth axis at a fixed elevation until a negative gradient and feedback signal is below a predefined threshold. While scanning, it may be desirable to capture points which have predefined thresholds such as 2 db, 3 db, etc. The step may be repeated in both directions to compensate for delays. The center may then be calculated using the thresholds as shown in FIG. 12. The dish may then be moved to the center of the azimuth.

Figure 13:
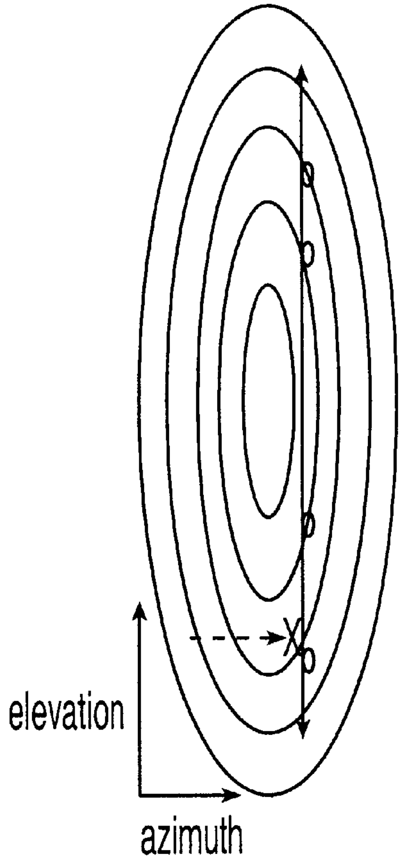
FIG. 13 shows an example of repeating steps 1 and 2 for the elevation axis.

Again referring to FIGS. 5*a* and 5*b*, in step 413–415, the above phase 1 and phase 2 steps may be repeated for the elevation axis in phase 3. This is shown as in FIG. 13.

Figure 14:
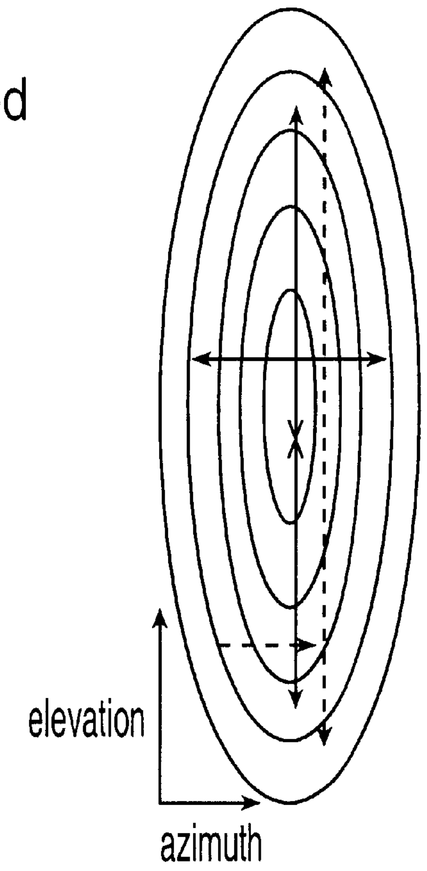
FIG. 14 shows that the whole polarization process may be repeated until convergence.

The steps described in FIGS. 5 and 5*b* are continued until the whole process meets a predefined set of convergence criteria which indicates the antenna is aligned. This is shown graphically in FIG. 14 where both the azimuth and elevation are aligned in the polarization process.

Figure 15:
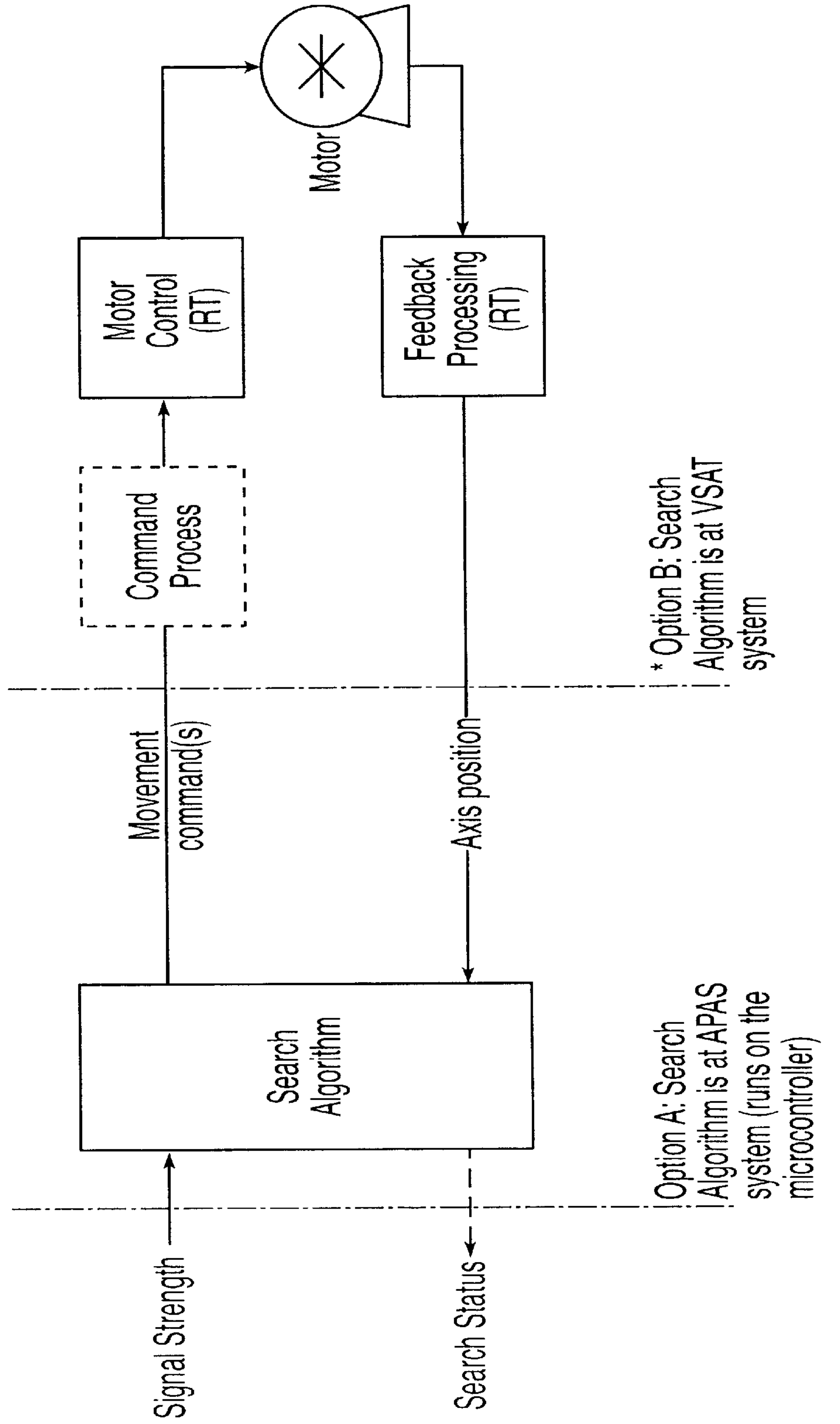
FIG. 15 shows a top level system chart of one exemplary feedback loop for use in the systems and methods described herein.

FIG. 15 shows a top level system diagram of the search algorithm which may be resident in the indoor and/or outdoor unit. In the most preferred embodiments, it is located in the indoor unit and uses the microprocessor located in the indoor unit. The motor and feedback processing are illustrated in FIG. 15.

FIG. 16 illustrates commands which may pass between the indoor unit and the motor and/or control unit(s). The commands shown in FIG. 16 are by way of example and not limitation.

FIG. 17 shows the set-up time estimations using aspects of the present invention.

FIG. 18 shows various modifications to the above search to increase the speed of the search routine.

Figure 19:
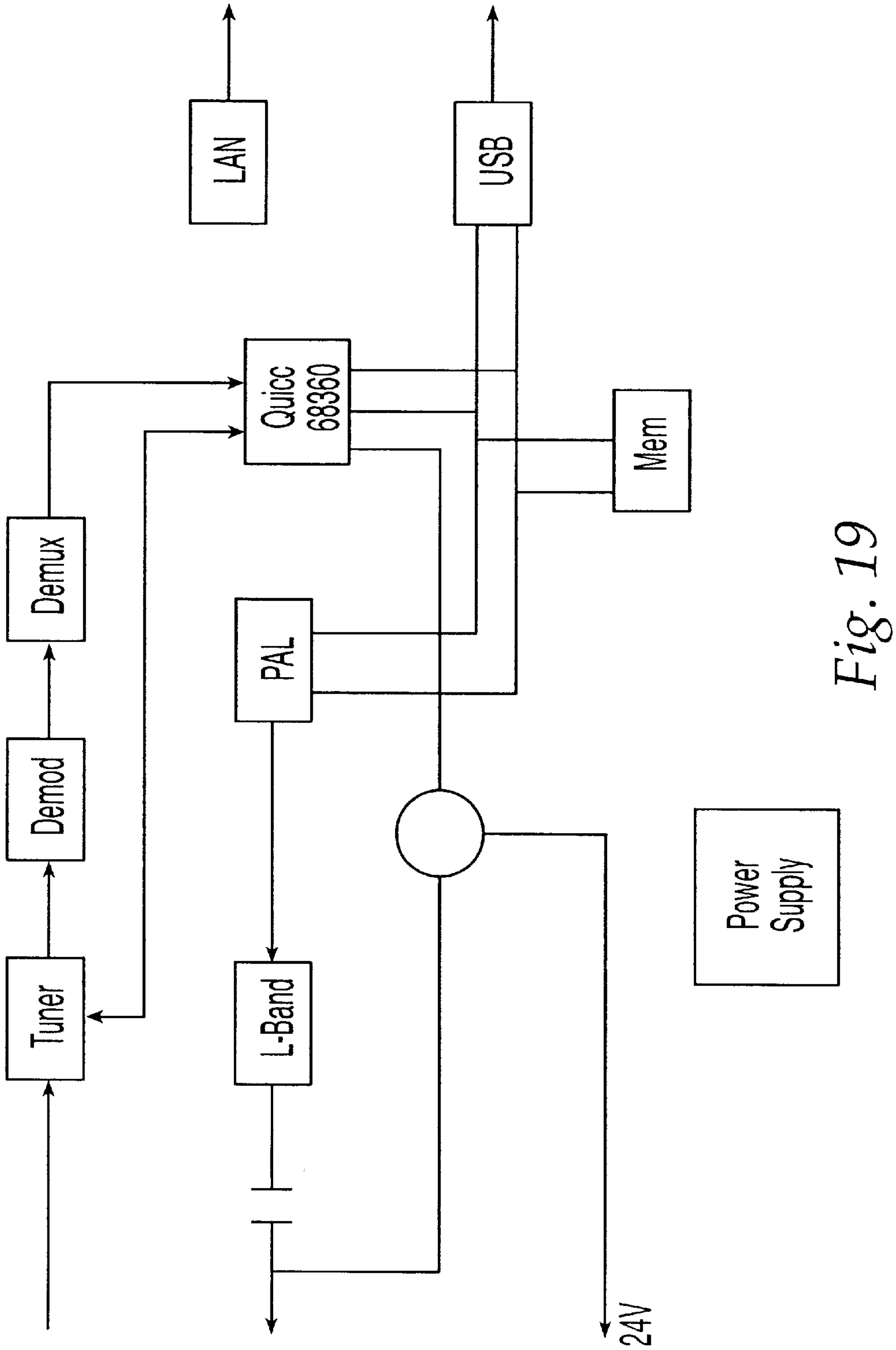
FIG. 19 shows an exemplary system configuration for the indoor unit described, for example, in FIG. 1.

FIG. 19 shows an exemplary configuration of an indoor unit. As will be known to those skilled in the art, many alternative configurations of the indoor unit may be utilized. The indoor unit may be one way or bidirectional for two-way communications.

Having described several embodiments of the automatic antennae system in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

I claim:

1. A method of automatically positioning an antenna on three mutually exclusive orthogonal planes, comprising the steps of:

determining initial azimuth, elevation, and polarization positions of said antennae;

determining an initial positioning level for skew and a rough azimuth angle and elevation;

setting a polarization value to 0; and performing a search of azimuth, elevation, and polarization of a satellite by moving said antennae on said three mutually exclusive orthogonal planes.

2. A method as recited in claim 1, comprising the further step of checking to ensure that a control cable connector is connected.

3. A method as recited in claim 1, comprising the further step of providing a failure indication when said satellite is not found.

4. A method as recited in claim 3, comprising the further step of stopping movement of said antennae when said failure indication is provided.

5. A method as recited in claim 3, comprising the further step of repeating said step of determining said initial azimuth, elevation, and polarization positions of said antennae, and repeating said method when said failure indication is provided.

6. A method as recited in claim 1, comprising the further step of providing a detection indication when said satellite is found.

7. A method as recited in claim 6, comprising the further step of stopping movement of said antennae when said detection indication is provided.

8. A method as recited in claim 7, comprising the further step of locking said antennae after said satellite is found so that said antennae is aligned with said satellite.

9. A method as recited in claim 8, comprising the further step of disconnecting a control cable connector.

10. A method as recited in claim 1, wherein said step of performing a search comprises the further steps of:

performing a course search; and performing a fine search.

11. A method as recited in claim 10, wherein said course search comprises:

scanning to determine azimuth, elevation, and polarization, a first course search.

12. A method as recited in claim 10, wherein said fine search is performed after a successful course search.

13. A method as recited in claim 10, wherein said coarse search comprises moving said antennae a predetermined number of coarse degrees and measuring any received signal.

14. A method as recited in claim 13, wherein said coarse search further comprises comparing the received signal to a threshold, and setting said azimuth, elevation and polarization when said signal is greater than said threshold.

15. A method as recited in claim 14, wherein when the signal is not greater than said threshold, said azimuth is changed.

16. A method as recited in claim 15, wherein when said azimuth is out of range, said elevation is moved a predetermined amount.

17. A method as recited in claim 16, wherein when said elevation is out of range and no the satellite was not found during the course search, said polarization is turned 90 degrees, and said coarse search is repeated.

18. A method as recited in claim 17, wherein when said polarization has previously been modified, a failure indication is provided.

19. A method as recited in claim 14, wherein when the signal is not greater than said threshold, said elevation is changed.

20. A method as recited in claim 19, wherein when said elevation is out of range, said azimuth is moved a predetermined amount.

21. A method as recited in claim 20, wherein when said azimuth is out of range and no the satellite was not found during the course search, said polarization is turned 90 degrees, and said coarse search is repeated.

22. A method as recited in claim 12, wherein said fine search comprises the steps of:

moving said azimuth; and determining if a gradient is negative and if so switching a direction of movement of said antennae.

23. A method as recited in claim 22, wherein said step of moving said azimuth continues until a local maximum azimuth is acquired.

24. A method as recited in claim 23, wherein said fine search comprises the further steps of:

calculating a threshold for symmetrical search when said gradient is negative a second time; and stopping movement of said antennae when a feedback signal is just above a predetermined level in order to maintain satellite acquisition.

25. A method as recited in claim 24, wherein said fine search comprises the further step of finding a center of said elevation readings using a symmetrical scan.

26. A method as recited in claim 25, wherein said step of finding the center of said elevation readings comprises:

scanning an elevation axis at a fixed azimuth until a negative gradient is found and a feedback signal is less than a predetermined threshold;

capturing points of pre-calculated thresholds;

repeating said scanning and capturing steps in opposite directions to compensate for delays; and calculating the center using said thresholds.

27. A method as recited in claim 24, wherein said fine search comprises the further step of finding a center of said azimuth readings using a symmetrical scan.

28. A method as recited in claim 27, wherein said step of finding the center of said azimuth readings comprises:

scanning an azimuth axis at a fixed elevation until a negative gradient is found and a feedback signal is less than a predetermined threshold;

capturing points of pre-calculated thresholds;

repeating said scanning and capturing steps in opposite directions to compensate for delays; and calculating the center using said thresholds.

29. A method as recited in claim 28, wherein said fine search comprises the further step of finding a center of said elevation readings using a symmetrical scan.

30. A method as recited in claim 29, wherein said step of finding the center of said elevation readings comprises:

scanning an elevation axis at a fixed azimuth until a negative gradient is found and a feedback signal is less than a predetermined threshold;

capturing points of pre-calculated thresholds;

repeating said scanning and capturing steps in opposite directions to compensate for delays; and calculating the center using said thresholds.

31. A method as recited in claim 30, wherein said fine coarse search is continued until a predetermined set of convergence criteria are met indicating that said antennae is aligned.

32. A system for automatically positioning an antenna on three mutually exclusive orthogonal planes, comprising:

a motor for moving said antennae in around an azimuth axis, an elevation axis and a polarization axis; and a microprocessor for controlling movement of said motor and receiving feedback relating to received signals, said microprocessor using a control algorithm to control positioning of said antennae to align said antennae with a satellite.

33. A system for automatically positioning an antenna on three mutually exclusive orthogonal planes, comprising:

an indoor unit including a satellite receiver, a telemetric transmission, a drive motor and an electronic search device; and an outdoor unit including a supervisory unit, a motor, and a control unit, wherein said outdoor unit searches in the three orthogonal planes to position the antenna is accordance with messages received from said telemetric transmission from said indoor unit.

* * * * *

UNITED STATES PATENT AND TRADEMARK OFFICE

CERTIFICATE OF CORRECTION

PATENT NO. : 6,563,471 B2
DATED : May 31, 2003
INVENTOR(S) : Danny Spirtus

It is certified that error appears in the above-identified patent and that said Letters Patent is hereby corrected as shown below:

Title page,
Item [73], Assignees, "Petak Tikya" has been replaced with -- Petah Tikva --.

Signed and Sealed this

Fourteenth Day of October, 2003

JAMES E. ROGAN
*Director of the United States Patent and Trademark Office*